United States Patent [19]

Miyakawa et al.

[11] Patent Number: 5,654,394

[45] Date of Patent: Aug. 5, 1997

[54] THERMOPLASTIC RESIN FILM

[75] Inventors: Katsutoshi Miyakawa, Kyoto; Katsuya Toyoda, Otsu; Akiko Yamamoto, Kusatsu; Kenji Tsunashima, Kyoto; Toshiya Ieki, Otsu, all of Japan

[73] Assignee: Toray Industries, Inc., Japan

[21] Appl. No.: 416,177

[22] Filed: Apr. 4, 1995

[30] Foreign Application Priority Data

| Apr. 8, 1994 | [JP] | Japan | 6-070789 |
| Dec. 15, 1994 | [JP] | Japan | 6-312193 |
| Jan. 9, 1995 | [JP] | Japan | 7-001094 |
| Feb. 14, 1995 | [JP] | Japan | 7-050616 |
| Feb. 20, 1995 | [JP] | Japan | 7-056641 |

[51] Int. Cl.$^6$ .......................................... B29L 7/00
[52] U.S. Cl. ..................... 528/272; 528/502 B; 528/503
[58] Field of Search .................... 356/357, 381, 356/382; 264/1.34, 406, 408, 409; 428/156, 900; 425/141; 528/272, 502 B, 503

[56] References Cited

U.S. PATENT DOCUMENTS

| 3,930,167 | 12/1975 | Hsiao | 356/357 |
| 4,748,329 | 5/1988 | Cielo et al. | 356/382 |
| 5,139,727 | 8/1992 | Utsumi et al. | 264/210.7 |
| 5,268,135 | 12/1993 | Sasaki et al. | 264/210.7 |

FOREIGN PATENT DOCUMENTS

| 55-46859 | 11/1980 | Japan . | |
| 58-81126 | 5/1983 | Japan | 264/408 |
| 61-200407 | 9/1986 | Japan | 356/357 |
| 63-62723 | 3/1988 | Japan . | |
| 63-162215 | 7/1988 | Japan . | |
| 1-55087 | 11/1989 | Japan . | |
| 4-35924 | 2/1992 | Japan . | |
| 4-34716 | 12/1992 | Japan . | |
| 5-245924 | 9/1993 | Japan . | |

*Primary Examiner*—Mathieu D. Vargot
*Attorney, Agent, or Firm*—Austin R. Miller

[57] ABSTRACT

A thermoplastic resin film wherein the variation in thickness of the film in the longitudinal direction is not more than 5% and the ratio "Pw1/PwT" of the sum of spectral intensities of wave-number components present in the wave-number range of 0.15 to 0.45 (1/m) (Pw1) to the sum of spectral intensities of the full wave-number range (PwT) determined when a wave form of the variation in thickness is subjected to analysis of Fourier transformation is not more than 0.20, and wherein the variation in thickness of the film in the longitudinal direction is not more than 5% and the ratio "Pw2/PwT" of the sum of spectral intensities of wave-number components present in the wave-number range of 1.00 to 2.00 (1/m) (Pw2) to the sum of spectral intensities of the full wave-number range (PwT) is not more than 0.15. In such a film, the uniformity in thickness can remarkably improved, and snaking and wrinkles in post processing can be prevented.

8 Claims, No Drawings

THERMOPLASTIC RESIN FILM

BACKGROUND OF THE INVENTION

1. Field of the Invention

The present invention relates to a thermoplastic resin film and a process for producing the same, more particularly to a thermoplastic resin film having a small variation in thickness and/or having a high elastic modulus and a high F-5 value, and a process for producing the same.

2. Description of the Prior Art

In production of a thermoplastic resin film, uniformity of thickness is an important basic quality. For example, a polyester film, which is a typical thermoplastic resin film, is employed for various uses such as a base film for magnetic recording media, an insulating material for capacitors and other electrical elements and devices, and a material for office automation equipment such as printers because of excellent properties thereof. In these uses, high uniformity in thickness and excellent mechanical properties are required. Therefore, minimizing the variation in thickness of a film and providing toughness to the film are very important.

As causes generating variations in thickness, there are various factors such as variations in the output of a molten resin delivered from a die when the molten resin is cast on a cooling drum in a form of a sheet or film, vibration of the resin film between the die and the cooling drum and variations in in the rotational speed of the cooling drum, and so on. When a biaxially stretched film is formed, besides these factors, there are other factors such as non-uniformity in surface temperature, variation in rotational speed of rollers employed for longitudinal stretching, non-uniformity in temperature and variation in wind speed of hot air in a tenter employed for transverse stretching.

Accordingly, various methods for limiting thickness variation in a film have been proposed. For example, a method for suppressing a variation of the rotational speed of a casting drum cooling and solidifying a molten resin is disclosed in JP-A-SHO 55-93420 and a method for modifying a resin such that the resin can be easily treated with an electrostatic force when a molten resin is brought into contact with a casting drum by the electrostatic force is disclosed in JP-A-SHO 59-91121. However, the results of these methods are not sufficient.

Further, a method for extruding a resin at a temperature not higher than the melting point of the resin is considered to be effective in order to prevent vibration in a film of a molten resin. For example, methods for extruding a resin at a temperature of not higher than the melting point of the resin are disclosed in JP-B-SHO 53-11980, JP-B-SHO 53-19625 and JP-B-HEI 1-55087. In these methods, however, a resin is cooled at a temperature of not higher than the melting point of the resin at a position upstream of a land of a die and when the resin after the cooling is supplied to the land portion of the die, the resin is molecularly oriented therein by reducing the cross section. In addition, after cooling the resin at a temperature of not higher than the melting point within the area inside of the die and almost solidifying the resin, the resin is supplied to the land, and the resin is extruded from the die while a shear stress is applied to the resin in the land portion. Therefore, in these methods, an extremely high pressure for extrusion is required, it is difficult to extrude the resin by a usual extruder and a particular extruder for high-pressure extrusion is required, it has a poor extrusion stability and only a film having a great variation in thickness is obtained. Further, a load applied to a die body or the whole of the die is large, thereby causing a deformation thereof and a decrease of durability thereof. Furthermore, because it is extremely difficult to extend the almost solidified resin in the width direction of the die, even if it can be extended, a film obtained becomes poor in uniformity in thickness originating from a variation of the resin flow, and the advantage aimed by the present invention to suppress a variation in thickness cannot be expected.

Further, in order to obtain a film having a high elastic modulus, generally it is required to further stretch a biaxially stretched film in a required direction. Therefore, in such a film, the yield in production is low and the cost for production becomes high, also a film having many surface defects, poor thermal dimensional stability and great variation in thickness is obtained.

Thus, although various methods have been proposed for improving a variation in thickness of a film, the effects thereof are still insufficient. Further, a film having a high elastic modulus, a good uniformity in thickness, a good thermal dimensional stability and no surface defects at the same time has not been obtained.

SUMMARY OF THE INVENTION

Accordingly, an object of the present invention is to provide a thermoplastic resin film having excellent uniformity of thickness and a process for producing the same, by preventing variation in thickness from being generated; this is done by classifying the variation into variation-generation factors thereof.

To accomplish the above-described object and other objects, in a thermoplastic resin film according to the present invention, the variation in thickness of the film in the longitudinal direction is held to not more than 5% and the ratio "Pw1/PwT" of the sum of spectral intensities of wave-number components present in the wave-number range of 0.15 to 0.45 (1/m) (Pw1) to the sum of spectral intensities of the full wave-number range (PwT) determined when a wave form of the variation in thickness is subjected to analysis of Fourier transformation is not more than 0.20.

Such a thermoplastic resin film can be achieved by supplying a thermoplastic resin to a die after heating and melting it at a temperature of not lower than a melting-finishing temperature "Tme"; extending the resin in a manifold of the die in the width direction of the die; cooling the resin in a land of the die at a temperature lower than the melting-finishing temperature "Tme" and not lower than the crystallization starting temperature caused in cooling "Tcb"; and extruding the resin from the die.

Namely, the above-described thermoplastic resin film can be formed as a thermoplastic resin film according to the present invention which has a variation in thickness in the longitudinal direction of not more than 5% and a ratio "Pw1/PwT" of the sum of spectral intensities of wave-number components present in the wave-number range of 0.15 to 0.45 (1/m) (Pw1) to the sum of spectral intensities of the full wave-number range (PwT), determined when a wave form of the variation in thickness is subjected to analysis of Fourier transformation, of not more than 0.20, obtained by supplying a thermoplastic resin to a die after heating and melting it at a temperature of not lower than a melting-finishing temperature "Tme", and after extending the resin in a manifold of the die in the width direction of the die, extruding the resin from the die after cooling the resin in a land of the die at a temperature of lower than the melting-finishing temperature "Tme" and not lower than the crystallization starting temperature caused in cooling "Tcb".

Further the above-described thermoplastic resin film is achieved by a process for producing a thermoplastic resin film according to the present invention which comprises the steps of: supplying a thermoplastic resin to a die after heating and melting it at a temperature of not lower than a melting-finishing temperature "Tme"; extending the resin in a manifold of the die in the width direction of the die; cooling the resin in a land of the die at a temperature of lower than the melting-finishing temperature "Tme" and not lower than a crystallization starting temperature caused in cooling "Tcb"; extruding the resin from the die in a form of a film; and casting the film on a cooling drum at a draft ratio of not less than 10 so that the film can have a so-called "stack structure" which is a systematic structure.

In another thermoplastic resin film according to the present invention, the variation in thickness of the film in the longitudinal direction is not more than 5% and the ratio "Pw2/PwT" of the sum of spectral intensities of wave-number components present in the wave-number range of 1.00 to 2.00 (1/m) (Pw2) to the sum of spectral intensities of the full wave-number range (PwT) determined when a wave form of the variation in thickness is subjected to analysis of Fourier transformation is not more than 0.15.

Such a thermoplastic resin film can be achieved by a process for producing a thermoplastic resin film according to the present invention, wherein, when a cast film is stretched uniaxially or biaxially, the film is stretched in a condition where there is a one-to-one correspondence between stretching strain and stretching stress thereof. Further, the thermoplastic resin film can be formed by a process wherein the cast film is stretched uniaxially or biaxially after the crystallinity of the film is controlled in the range of 0.5% to 25%.

In a further thermoplastic resin film according to the present invention, the variation in thickness of the film in the longitudinal direction is not more than 5%, the ratio "Pw1/PwT" of the sum of spectral intensities of wave-number components present in the wave-number range of 0.15 to 0.45 (1/m) (Pw1) to the sum of spectral intensities of the full wave-number range (PwT) determined when a wave form of the variation in thickness is subjected to analysis of Fourier transformation is not more than 0.20, and the ratio "Pw2/PwT" of the sum of spectral intensities of wave-number components present in the wave-number range of 1.00 to 2.00 (1/m) (Pw2) to the sum of spectral intensities (PwT) is not more than 0.15.

In the above-described thermoplastic resin films according to the present invention, the uniformity in thickness can be remarkably improved, and troubles such as snaking in film running and occurrence of wrinkles can be prevented.

DETAILED DESCRIPTION OF THE PREFERRED EMBODIMENTS OF THE INVENTION

The present invention will be explained in more detail by embodiments and examples. However, the present invention is not restricted by the embodiments and examples.

In the present invention, the variation in thickness of the film in the longitudinal direction must be not more than 5%. It is preferably not more than 4%, and more preferably not more than 2%. If the variation in thickness is more than 5%, because the difference in thickness between a thick portion and a thin portion of the film becomes too great, the difference of properties between the film portions is large and it becomes difficult to use the film. For example, in the uses for base films for thermosensible stencils and printer ribbons, this variation in thickness causes a bad film running property and a variation in density of print and the finished quality is not good. In the uses for electrical insulating materials and capacitors, the thin portion of the film generates a dielectric breakdown, and it is likely to cause a failure of equipment. In the recent uses, a particularly excellent uniformity in thickness has been required from the viewpoint of high performance of hardware.

In a film according to the present invention, it is further required that the ratio "Pw1/PwT" of the sum of spectral intensities of wave-number components present in the wave-number range of 0.15 to 0.45 (1/m) (Pw1) to the sum of spectral intensities of the full wave-number range (PwT) determined when a wave form of a variation in thickness of the film is subjected to analysis of Fourier transformation is not more than 0.20. The ratio "Pw1/PwT" is preferably not more than 0.15, and more preferably not more than 0.10. In the present invention, as the result of the earnest investigation, it has been found that the period of the variation in thickness of the film corresponds to kinds of troubles caused by the variation. Namely, when the wave form of the variation in thickness is analyzed with frequency, there is a correspondence that a specified kind of trouble occurs in a case where there exist many components of variation in thickness having a specified range of period. Where, when the wave form of the variation in thickness is analyzed by Fourier transformation, it has been found that the spectral intensities in the range of 0.15 to 0.45 (1/m) in wave number tend to cause snaking of film running, disturbance in winding and generation of wrinkles when the film is post-processed. Namely, if the ratio "Pw1/PwT" of the sum of spectral intensities of wave-number components present in the wave-number range of 0.15 to 0.45 (1/m) (Pw1) to the sum of spectral intensities of the full wave-number range (PwT) is more than 0.20, when the film is subjected to a processing such as coating or to a post-processing such as slitting to a predetermined width, troubles such as snaking of film running, disturbance in winding and generation of wrinkles are often caused.

Further, in a film according to the present invention, it is required that the ratio "Pw2/PwT" of the sum of spectral intensities of wave-number components present in the wave-number range of 1.00 to 2.00 (1/m) (Pw2) to the sum of spectral intensities of the full wave-number range (PwT) is not more than 0.15. The ratio "Pw2/PwT" is preferably not more than 0.10. It has been found that the spectral intensities in the range of 1.00 to 2.00 (1/m) in wave number tend to cause generation of wrinkles when the film is post-processed. Namely, if the ratio "Pw2/PwT" of the sum of spectral intensities of wave-number components present in the wave-number range of 1.00 to 2.00 (1/m) (Pw2) to the sum of spectral intensities of the full wave-number range (PwT) is more than 0.15, when the film is subjected to post-processing, troubles such as generation of wrinkles are often caused.

In the present invention, it is more preferred that the ratio "Pw1/PwT" is not more than 0.20 and the ratio "Pw2/PwT" is not more than 0.15.

As the thermoplastic resin according to the present invention, a polyolefin resin such as polyethylene, polypropylene or polymethylpentene, a polyamide resin such as nylon 6 or nylon 66, a polyester resin such as polyethylene terephthalate, polybutylene terephthalate, polyethylene-2,6-naphthalate or poly-1,4-cyclohexanedimethylene terephthalate, and a polyacetal resin and a polyphenylene sulfide resin can be used. Particularly in the present invention, use of polyesters, specifically, polyethylene terephthalate and polyethylene-2,6-naphthalate is preferred because a higher advantage aimed in the present invention can be obtained. However, the resin to be used is not particularly restricted by these resins, and a resin copolymerized with other monomers or polymers may be employed, and further, a resin blended with other resins such as a liquid crystalline polyester may be employed. In order to achieve a remarkable advantage according to the present invention, it is desired that the intrinsic viscosity of these polyester resins is preferably not less than 0.6, more preferably not less than 0.8, further more preferably not less than 1.0. Further, various known additives, for example, an antioxidant, an antistatic agent, a conductive agent, a crystal nuclei agent and inorganic particles may be added to these resins. Particularly, in a case where an electrostatic charge is applied to the casting process, a metal or its compounds can be contained in the resin so that the volume intrinsic resistance of the molten resin for forming the film indicates a value of not more than $10^{10}$ $\Omega$·cm, preferably not more than $10^8$ $\Omega$·cm.

As one of the processes for producing a film according to the present invention, there is a process for supplying a thermoplastic resin to a die after heating and melting it at a temperature of not lower than a melting-finishing temperature "Tme", after extending the resin in a manifold of the die in the width direction of the die, cooling the resin in a land of the die at a temperature of lower than the melting-finishing temperature "Tme" and not lower than a crystallization starting temperature caused in cooling "Tcb", and extruding the resin from the die, that is, a so-called super-cooling extrusion process. Further, at the time of the super-cooling extrusion, the film may cast by a draft ratio of not less than 10 so that the cast film can have a so-called "stack structure" which is a systematic structure.

The melting-finishing temperature "Tme" and crystallization starting temperature caused in cooling "Tcb" can be determined by differential scanning calorimetry (DSC) employed in a usual thermal analysis, and using it, endothermic and exothermic amounts accompanied with a change of a state such as melting, crystallization, phase transformation or thermal decomposition can be determined. When the melting temperature at the time of heating and the crystallization starting temperature at the time of cooling are determined by DSC, although a known method is employed, items to be noted here are speeds of the heating and cooling. For example, in the determination of the melting temperature, if the heating speed is too fast, the melting temperature determined shifts to a high-temperature side. On the contrary, if the heating speed is too slow, the melting temperature determined shifts to a low-temperature side. In consideration of the practical conditions of extrusion, a preferred heating and cooling speed is usually in the range of 10° to 30° C./min. In the present invention, a speed of 20° C./min is employed.

In the present invention, the thermoplastic resin must be melted by heating at a temperature not lower than a finishing temperature of an endothermic peak "Tme" at the time of melting in DSC. This process is usually performed in an extruder. If the resin temperature is not higher than the starting temperature of the endothermic peak "Tmb" at the time of melting, the resin has almost no flowability, and in such a condition, the resin cannot be extruded by a usual extruder. Further, even if the resin temperature is higher than the temperature "Tmb", if it is lower than the temperature "Tme", a part of the resin remains in a non-molten state. Therefore, in such a condition, troubles such as clogging of a filter and generation of defects due to foreign materials in a film after formation are caused. Accordingly, in order to control the heating of the resin so that the molten resin has no non-molten part, that is, so that the resin can be completely molten, the heating is performed at a temperature of not lower than "Tme", preferably not lower than "Tme plus 10° C.".

The die used in the present invention is not particularly restricted. For example, various dies for forming a molten thermoplastic resin in a form of a sheet or a film, which are explained, for example, in "Extrusion and Formation of Plastics and Application thereof" (K. Sawada, Seibundo Shinkosha [a Japanese publisher]), such as a manifold die having a tubular manifold with a relatively large diameter therein, a fish tail die which does not have a manifold and which is formed as a fish tail-like shape, or a coat hanger die having a form between the manifold die and the fish tail die, may be employed.

A flat die is usually constructed from a portion called "die hopper" which extends a molten resin in the width direction of the die and a portion called "land" which forms the extended molten resin as a final shape to be extruded and has a pair of parallel inner wall surfaces forming a substantially constant gap therebetween. Of course, a structure wherein a die hopper is provided on the way to a land for temporarily storing the molten resin therein, that is, a die having a path of a land, a die hopper and a land in this order, may be employed. Further, a die having two or more lands may be employed. The resin is cooled during passing through the land at a temperature between the endothermic peak "Tme" and the crystallization starting temperature "Tcb". The cooling efficiency of the resin is better in a die having a plurality of lands. After cooling, the resin is delivered from the die into the atmosphere, and after being applied with a necessary draft ratio, the resin is cooled on a cooling drum. At that time, a small heater may be provided on a lip portion of the tip of the die for partially heating the die, thereby preventing surface defects such as a die line on the extruded sheet. Further, the method may comprise casting the molten resin formed as a sheet on a cooling drum while applying an electrostatic charge on the molten resin, or a method of cooling and solidifying the molten resin sheet on a cooling drum having a water film with a thickness of 0.01 to 1 μm on the surface of the drum, or a combination method thereof may be preferred from the viewpoint of improvement of contact properties of the resin to the drum.

In the conventional process for producing a thermoplastic resin film by extrusion forming, a resin heated and molten in an extruder at a temperature higher than the melting point is sent to a die through pipes connecting to intermediate equipment such as a filter and a gear pump. The resin sent to the die is formed in the shape to be desired, and thereafter extruded from the die. The resin temperature at the time of this extrusion is usually a temperature higher than the melting-finishing temperature "Tme". On the contrary, in the present invention, the resin is cooled down to a temperature lower than the melting-finishing temperature "Tme" and not lower than the crystallization starting temperature caused in cooling "Tcb". This cooling must be performed in the land of the die. If the cooling of the resin is performed at a position upstream of the land before entering the die, the viscosity of the resin increases, the flowability deteriorates, and as the case may be, the resin is solidified. As a result, an abnormal extrusion or abnormal flow occurs, or the extrusion itself may become impossible. Such a condition is not desirable because a large load is applied on the extruder, the filter and the gear pump and it causes a deformation thereof or reduction of the life thereof. Further, even in the cooling in the die, if the cooling is performed before reaching the land (for example, at the die hopper), because the resin is in a condition during formation to a predetermined shape in such a portion, the cooling is likely to cause a variation in temperature and an abnormal flow, thereby causing an increase of the variation in thickness. Particularly, in a flat die (a manifold die), because the length of the flow path of the resin varies in the width direction of the die, the thermal history of the resin is not uniform in the width direction of the die from the difference of the cooling time, and a variation in temperature is generated in the width direction. Therefore, the formation property of the resin deteriorates, and not only a sufficiently good advantage for improving the variation in thickness cannot be obtained but also there occurs a case where the variation in thickness further deteriorates. On the other hand, cooling in the land of the die is a cooling after the molten resin is extended in the width direction to a predetermined shape to be extruded, and the cooling can be uniformly performed. The land is a portion having the smallest gap among the portions in the die, and it can have a high efficiency in heat exchange and it is suitable for cooling. Further, since the resin is extruded immediately after cooling, the increase of the filtration pressure accompanying with the increase of the viscosity and occurrence of abnormal extrusion and abnormal flow due to solidification can be suppressed to minimum.

In the present invention, the cooling of the resin in the land must be performed at a temperature lower than "Tme" and not lower than "Tcb". In a case of a polymer, the molten resin can be maintained in a condition of fluid of so-called supercooling in which the molten resin is not solidified in a short period of time even if the molten resin is cooled to a temperature lower than "Tme". The resin controlled in this supercooled condition has a high viscosity, and the resin extruded from the land of the die is stable against film vibration of the cast film present between the die and a cooling drum or an external turbulence. As a result, a film having a small variation in thickness can be obtained. Further, the cooling must be performed at a temperature not lower than the crystallization temperature caused in cooling "Tcb" of the resin. If the temperature is lower than "Tcb", the resin begins to crystallize, the surface roughness of the extruded film increases, abnormal extrusion state and variation in resin flow occur, and because the resin becomes solidified in a certain time, it cannot be extruded by the usual extruder. In the present invention, although the resin is cooled in the land of the die at a temperature not higher than the melting point, an important matter is to maintain the resin in a condition where the resin is not solidified upon cooling. Namely, it is important in the present invention to extrude the resin in a liquid phase utilizing supercooling of the polymer.

Although the cooling means in the land of the die is not particularly restricted, for example, there is means for providing a hole or a plurality of holes in the wall forming the land portion and supplying a refrigerant (cooling medium) into the hole or holes. As the cooling medium, air or a liquid cooling medium such as water or other materials can be used, and the land can be controlled at a desired temperature by controlling the temperature and flow rate of the cooling medium.

Further, in the present invention, it is preferred that the relationship between the temperature of the resin Tin (° C.) at the entrance of the land of the die and the temperature of the resin Tout (° C.) at the exit of the land of the die satisfies an equation: Tin−Tout>20° C., in order to prevent solidification of edge portions. Namely, although the resin is cooled in the land, at that time, it is preferred that the resin is extruded at a transient state of the cooling. By such an extrusion at the transient state of the cooling, the edge portions having a greater thickness than other portions remain in a condition of a relatively high temperature, and it is possible to suppress the solidification from the edge portions. However, if Tin−Tout≤20° C., the resin is in a stationary state in the land by a sufficient cooling, the temperature of the edge portions becomes the same as that of the central portion, and solidification from the edge portions is liable to occur. As another method for preventing the solidification of the edge portions, separately controlled heaters may be provided on both side surfaces of the edge portions.

By the process for supplying a thermoplastic resin to a die after heating and melting it at a temperature of not lower than a melting-finishing temperature "Tme", after extending the resin in a manifold of the die in the width direction of the die, cooling the resin in a land of the die at a temperature lower than the melting-finishing temperature "Tme" and not lower than the crystallization starting temperature "Tcb", extruding the resin from the die in a form of a film, and casting the film on a cooling drum at a draft ratio of not less than 10 so that the film can have a stack structure which is a systematic structure, a film having not only a good uniformity in thickness but also a high stiffness can be obtained. Where, the "stack structure" can be determined by solid NMR (nuclear magnetic resonance), and it means a structure having a releasing time "T1 ρ" of 1,4-position benzene-ring carbon determined from solid NMR of not less than 100 msec, preferably not less than 120 msec. Further more preferably, it means a structure satisfying the following equation with respect to the ratio of spectral intensities of a kinetic component of an amorphous chain (a) and a kinetic component of a crystal chain (b) determined from solid NMR.

$$a < b$$

These values are the lengths, of the CP/MAS spectra "a" and "b" of the benzene ring portion of the polymer due to solid state NMR and the releasing time "T1 ρ" (msec) of 1,4-position benzene-ring carbon determined from solid NMR. The release time "T1 ρ" represents ease of motion of a molecule. If the "T1 ρ" time is long, it means that the kinetic property of the molecule is restricted and the molecule is hard to move, and if the "T1 ρ" time is short, it means that the motion of the molecule can be easily performed. The "T1 ρ" time of a cast film rapidly cooled after melt-extrusion at a temperature of not lower than a melting point in a conventional process is in the range of 50 to 80 msec, and the molecule can move relatively easily. Therefore, when the film is stretched, the above-described variations in thickness and surface defects are generated. Also, only a film having a low elastic modulus and a poor thermal dimensional stability can be obtained. Accordingly, in the present invention, by uniaxially or biaxially stretching a film having a systematic structure (stack structure) wherein the release time "T1 ρ" is not less than 100 msec, preferably not less than 120 msec, a film excellent in uniformity in thickness and having a high elastic modulus can be obtained.

The above-described length the CP/MAS spectrum "a" is a length determined by subtracting a background from the height of a peak (A) at a position of 134 ppm originating from an amorphous structure, and the length "b" is a length determined by subtracting a background from the height of a peak (B) at a position of 130 ppm originating from a crystal structure. Although the "a" and "b" values both become large as a result of stretching or heat treatment of the film because molecular motion is restricted, the degrees of changes of the "a" and "b" values are different from each other, and the value "a" tends to become larger than the value "b" (a>b). In the present invention, however, particularly by stretching a film having a relationship of a<b, a good stretching property can be obtained and a stretched film having few surface defects, a small variation in thickness and a high elastic modulus can be obtained.

Further, it is preferred that the birefringence of the cast film thus obtained is in the range of 0.0002 to 0.0100, that is, it is substantially not oriented but it has a specified stack structure. By this, deterioration of stretching property in succeeding processes can be prevented, a film having a good thermal dimensional stability in spite of having a high elastic modulus and and few surface defects and little variation in thickness can be obtained.

The present invention provides a thermoplastic resin film wherein the variation in thickness of the film in the longitudinal direction is not more than 5% and the ratio "Pw2/PwT" of the sum of spectral intensities of wave-number components present in the wave-number range of 1.00 to 2.00 (1/m) (Pw2) to the sum of spectral intensities of the full wave-number range (PwT) determined when a wave form of the variation in thickness is subjected to analysis of Fourier transformation is not more than 0.15. As the process for producing this film, there is a process wherein the cast film is stretched in a condition where there is a one-to-one correspondence between stretching strain and stretching stress. In this process, for example, the non-stretched film is introduced into a group of heated rollers, the film is stretched in the longitudinal direction and heat treated in a specified condition, and further, a film having specified crystallinity and birefringence must be stretched. Namely, it has been found that the variation in thickness corresponding to the wave-number components present in the wave-number range of 1.00 to 2.00 (1/m) is caused mainly by the variation in stretching in the longitudinal direction. Further, it has been found that it is effective to provide a specified crystallization before the longitudinal stretching in order to suppress this variation in stretching. Concretely, it is preferred to provide a crystallization of a crystallinity of 0.5 to 25%, more preferably, a crystallinity of 1.0 to 10%, and it is further preferred to stretch an oriented and crystallized film having a birefringence of 0,002 to 0,040 in the longitudinal direction at one stage or a plurality of stages.

Usually, the stretching stress-stretching strain curve of an amorphous non-oriented polyethylene terephthalate indicates a property so that, after the stress becomes the maximum point (yield point), the stress reduces, and there is a flat zone where the stress does not increase relative to the strain. If stretching is performed in this zone, because the stretching is performed at a constant stress, the stretching strain does not correspond to the stretching stress at a certain single point and three or more points of stretching strains corresponds to a certain single stretching stress. As a result, the stretching ratio (draw ratio) has various values, the stretching ratio varies depending upon positions and this causes a deterioration of variation in thickness. However, as the result according to the investigation conducted by the inventors of the present invention, it has been found that the stress-strain curve of a film provided with a slight crystallization, that is, provided with a crystallinity of 0.5 to 25% indicates no yield point which is the maximum point of the stress, and the curve rises and the stress and the strain can have a one-to-one correspondence. Namely, in a case of such a film which is provided with a slight crystallization, a film causing no deterioration of the variation in thickness can be realized. If the crystallinity is less than 0.5%, the effect of the rise of the stress-strain curve is small. If the crystallinity is more than 25%, deterioration of the stretching property occurs and the variation in thickness occurs.

In order to achieve the above-described crystallinity, it is preferred to crystallize the amorphous non-stretched film before a longitudinal stretching by heat treatment. The temperature of the heat treatment is preferably not lower than the glass transition temperature "Tg" plus 10 ° C. and not higher than the melting point "Tm" minus 50° C. More preferably the temperature is not lower than (Tg+20° C. ) and not higher than (Tm–100° C. ). If the temperature of the heat treatment is lower than (Tg+10° C. ), the effect of the crystallization due to the heat treatment is small, or it takes a long period of time to obtain a crystallinity to be required. If the temperature is higher than (Tm–50° C. ), control of the crystallinity is difficult, and because the film is too soft, the handling of the film during the heat treatment becomes difficult. Further, the above-described heat treatment can be appropriately performed using heating rollers. As the heating roller, a roller whose surface is applied with non-sticking processing such as a Teflon or silicone rubber processing or plating of a metal dispersed with Teflon is preferred. Furthermore, the heat treatment may be performed in an oven. As the oven, although a type of oven heating with no hot air may be used, an oven blowing hot air onto the film is preferably used from the viewpoint of heating efficiency.

Although means for clamping a film in the oven is not particularly restricted, rollers in which water is circulated for preventing the film from sticking to the roller surfaces and a tenter wherein clips clamp both edges of the film can be preferably employed. Further, a heating-floating treatment apparatus, wherein hot air is blown from the lower side of the film and heat treatment performed while the film is floated by the hot air, can also be appropriately used. In such a heating-floating treatment apparatus, because there is no problem on sticking of a film and the film is supported at surface thereof by the pressure of the hot air, the film can be heat treated without problems of running ability even if the film is softened by heating.

Generally, in the process for heat treating an amorphous non-oriented film, there are problems that a high temperature is required to obtain an aimed crystallinity and that the control of the crystallinity is fairly difficult. Accordingly, it has been found that, if a film is heat treated after provided with a pre-orientation,the film can be crystallized at a relatively low temperature, the crystallinity can be easily controlled by the conditions of the pre-orientation and the temperature of the heat treatment, and the time required for the heat treatment can be greatly shortened. For example, in a case of a polyethylene terephthalate film, the pre-orientation can be performed by stretching the film at a film temperature of not lower than 80° C. and not higher than 100° C., preferably not lower than 85° C. and not higher than 95° C., and a draw ratio of not less than 1.5 times and not more than 2.5 times, preferably not less than 1.8 times and not more than 2.3 times. This range becomes a range of 0,002 to 0.040 in birefringence "Δn" of film. Where, if the stretching temperature is lower than 80° C., it is not preferred because a variation in stretching occurs. If the stretching temperature is higher than 100° C., the effect due to the pre-orientation is small. If the draw ratio is less than 1.5 times, similarly the effect due to the pre-orientation is small. If the draw ratio is more than 2.5 times, it is not preferred because a variation in thickness corresponding to the wave-number components present in the wave-number range of 1.00 to 2.00 (1/m) is generated by the stretching for the pre-orientation. By providing such a pre-orientation, an aimed crystallinity can be provided relatively easily by a post heat treatment, for example, in a case of a polyethylene terephthalate film, at a relatively low heat treatment temperature of 90° to 120° C. and a relatively short time for heat treatment of 0.5 to 5 seconds in conditions of the post heat treatment. Further, because the crystallinity can immediately reach the aimed value by the conditions of the pre-orientation and the crystallinity almost does not vary even if the time of the heat treatment varies, the control of the crystallinity can be greatly facilitated. Since the heat treatment after the pre-orientation can be performed at a relatively low temperature and a relatively short period of time, it is preferred to use heating rollers for the heat treatment. Of course, an auxiliary heating means such as an infrared heater may be used.

The crystallized film thus obtained is heated by rollers controlled at a temperature of 80° to 120° C. and stretched in the longitudinal direction at a draw ratio of 1.5 to 10 times and at a single stage or a plurality of stages, and thereafter cooled by a group of cooling rollers at a temperature of 20° to 50° C. This longitudinal stretching may be conducted immediately after the heat treatment for crystallizing a film provided as a process upstream of the longitudinal stretching process. In this case, because the heating for the stretching can be performed also in the heat treatment process, the apparatus can be simplified as a whole. Further, in a case where the temperature for the stretching is lower than the temperature for the heat treatment, if the stretching is performed while cooling successively to the heat treatment for the crystallization, because thick portions present in a film having a variation in thickness before the stretching are stretched in a condition where the portions are maintained at a high temperature, the portions can be stretched more easily, and because the portions are corrected thinner in the thickness variation, the variation in thickness after the longitudinal stretching can be suppressed smaller.

The film thus obtained may be subjected as a product as it is, that is, as a cast film, or may be stretched and heat treated for providing orientation and crystallization to the cast film to improve the properties of the film. As the process for providing an orientation to the east film, a process for stretching the film in the longitudinal direction between rollers having different circumferential speeds at a single stage or two or more stages can be employed. As the process for producing a biaxially oriented film, known processes, particularly, such as a process for stretching the film in the longitudinal direction at a temperature of Tg+20° C. to Tg+50° C. and a draw ratio of 1.5 to 2.5 times as the first stage and thereafter stretching the film at a temperature near Tg and a draw ratio of 2 to 4 times as the second stage, successively stretching the film in the transverse direction in a tenter, and as needed, stretching the film again in the longitudinal direction and/or transverse direction, and heat treating the film, and a process for stretching the film simultaneously in the longitudinal and transverse directions in a tenter and heat treating the film, can be employed. Particularly, in a case where a stiffness in the longitudinal direction is required, for example, an F-5 value of not less than 20 kg/mm$^2$, preferably not less than 25 kg/mm$^2$, is required, it is necessary to use a process for using a multi-stage longitudinal stretching process having two or more stages for the longitudinal stretching of the film, stretching the film in the longitudinal direction at a temperature near the glass transition temperature Tg of the film in the final stage and thereafter stretching the film in the transverse direction, or a process for stretching again in the longitudinal direction after biaxially stretching.

The film thus obtained is effective to uses for a film requiring a small thickness, for example, a thickness of 0.1 to 50 μm, preferably 0.5 to 15 μm, particularly suitable to uses for capacitors, printer ribbons and magnetic recording media.

Next, the methods for determining and estimating the properties of the film according to the present invention will be explained.

(1) Thermal Property:

Using a differential scanning calorimeter RDC220 (a robot DSC produced by Seiko Instruments Inc.), a sample of 5 mg was maintained in a molten condition at 300° C. for five minutes, and after rapidly cooled and solidified by using a liquid nitrogen, the sample was heated from a room temperature at a heating speed of 20° C./min. The glass transition temperature determined at that time was defined as "Tg", the starting temperature of the melting endothermic peak determined at that time was defined as "Tmb", the peak temperature was defined as "Tm" and the finishing temperature of the peak was defined as "Tme". Further, after a sample of 5 mg was maintained in a molten condition at 300° C. for five minutes, the sample was cooled at a cooling speed of 20° C./min. The starting temperature of the exothermic peak of the crystallization caused in the cooling was defined as "Tcb", the peak temperature was defined as "TC" and the finishing temperature of the peak was defined as "Tce".

(2) Variation in Thickness of Film:

Using a film thickness tester KG-601A and a electronic micrometer K-306C produced by Anritsu Corporation, the thickness of a sample film cut at a width of 30 mm and a length of 10 m in the longitudinal direction of the film was continuously determined. (R=Tmax−Tmin) was determined from the maximum value of thickness "Tmax" and the minimum value of thickness "Tmin" in the 10 m length, and the variation in thickness was determined from an equation of [the variation in thickness (%)=R/Tave×100] using the above "R" and the average thickness "Tave" of the 10 m length.

(3) Analysis of Fourier Transformation of Variation in Thickness of Film:

The output from the electronic micrometer in the above-described determination of variation in thickness was converted to digital signal via an analog/digital converter (A/D converter) and supplied to a computer. In the data processing, a pre-amplifier may be connected between the electronic micrometer and the A/D converter as needed in order to conform the output from the electronic micrometer as the input signal of the A/D converter. In the present invention, the output from the electronic micrometer was sent to an A/D converter "ADX-98E" and a trigger unit "ADT-98E" attached to the A/D converter produced by Canopus Electronics Corporation via a pre-amplifier made by the inventors of the present invention, and the data were read in a personal computer "PC9801VM" produced by NEC Corporation. For reading the data, a software made by the inventors of the present invention was used. The data were read at a number of 1,024 and at an interval of 0.195 second during the determination of the variation in thickness of the sample having a length of 10 m. (because the sample film was run at a speed of 3 m/min during the determination and [0.195 second×1,024×3 m/min+60 second/minute=9.98 m], the data in the 9.98 m length were read.) Of course, the equipment used for the determination are not restricted, and there are many known kinds of equipment having the same functions. The data thus read were processed by fast Fourier transformation (FFT) using a software made by the inventors of the present invention. In this processing, when the film formation time (unit: second) converted from the film formation speed and the film running speed in the determination is set as a parameter in the chart direction (processing flowing direction), a distribution of intensities relative to frequency (unit: Hz) can be obtained by the FFT processing. Further, when the length of the film (unit: m) is set as a parameter in the processing direction, a distribution of intensities relative to wave number (unit: 1/m) can be obtained by the FFT processing. FFT processing is known processing as described in detail, for example, in "Mathematics for Engineers I" published by Kyoritsu Publishing Company as to theory of Fourier transformation and in "Optical Engineering" published by Kyoritsu Publishing Company as to method for FFT processing. The data read were processed by FFT processing as shown by the following equations, and the sum of spectral intensities.

$$Xn = \sum_{k=0}^{N-1} \times ke^{-j2\pi kn/N} = \sum_{k=0}^{N-1} \times k \left( \cos \frac{2\pi kn}{N} - j\sin \frac{2\pi kn}{N} \right) \quad (1)$$

In the equation (1),
xk: thickness (μm)
Xn: Fourier transformation
j: imaginary unit
and $0 < k$, $n < (N-1)$ and $N = 1,024$.

When the real number portion of "Xn" is represented by "$a_n$" and the imaginary portion thereof is represented by "$b_n$", the spectral intensity "$P_{w^n}$" can be expressed by the following equation (2).

$$P_{w^n} = \frac{2}{N} \sqrt{a_n^2 + b_n^2} \quad (2)$$

On the other hand, the wave number relative to "n" is n/10 (1/m), because the determination length is 10 m, and when "n" corresponding to a wave number "α" is represented by "nα" and "n" corresponding to a wave number "β" is represented by "nβ", the sum of the spectral intensities in the wave-number range of "α" to "β" can be expressed by the following equation (3).

$$\text{Sum of spectral intensities} = \sum_{n=n_\alpha}^{n_\beta} P_{w^n} \quad (3)$$

The sum of spectral intensities of the full wave-number range becomes the sum in the range of $1 \leq n \leq (N/2-1)$, and the sum of spectral intensities of the full wave-number range can be expressed by the following equation (4).

$$\text{Sum of spectral intensities in the full range} = \sum_{N-1}^{N/2-1} P_{w^n} \quad (4)$$

(4) Birefringence:
Using a polarization microscope equipped with a Berek compensator, a retardation "Rd" of a film was determined. The value obtained by dividing the "Rd" by the thickness of the film was defined as the birefringence.

(5) Temperature of Resin:
The temperatures of a resin in a die were determined by thermo couples inserted into holes extending straightly which were defined at portions to be determined while sealed for preventing the resin from being leaked. The temperature of the extruded resin at an exit portion of the die was determined directly by a contact-type thermometer.

(6) Temperature of Film:
Using a non-contact type thermometer "Type 505" produced by Minolta Camera Co., Ltd., the temperatures of points to be determined of a film were measured. The emissivity was set to 0.95 in the measurement.

(7) Crystallinity:
A density gradient pipe using a sodium bromide solution was prepared, and the density of a film at 25° C. was determined. From the determined density "d", the crystallinity was determined by the following equation.

Crystallinity $(\%) = (d-da)/(dc-da) \times 100$

Where, "da" indicates an amorphous density, "dc" indicates a completed crystal density, and in a case of polyethylene terephthalate, from the data of a publication, 1.335 g/cm³ was used as the value of "da" and 1.455 g/cm³ was used as the value of "dc".

(8) Stress-Strain Curve:
Using a biaxially stretching apparatus produced by Kabushiki Kaisha Toyo Seiki Seisakusho, a sample having a size of 90 mm×90 mm was prepared, and after preheating the sample under an atmosphere condition at a predetermined temperature for 20 seconds, the sample was stretched in the longitudinal direction under restriction in the transverse direction at a stretching speed of 2,000%/min, and the stress was determined by a strain meter attached to a clip in the apparatus.

(9) Suitability for Processing:
While a film wound at a width of 500 mm was unwound from an unwinder, the film was supplied to an oven treatment apparatus produced by Inoue Metal Industries, Inc. at a running speed of 20 m/min, and the film was wound by a length of 100 m after heat treatment at 180° C. In this winding, a case where the film edge was projected from the end surface of the film roll by, for example, snaking, at a projection size more than 10 mm was determined as "X", a case where the projection size was not less than 5 mm and not more than 10 mm or where the projection size was less than 5 mm but wrinkles were observed during the processing was determined as "Δ", and a case where the projection size was less than 5 mm and wrinkles were not observed during the processing was determined as "○".

(10) Thickness of Water Film:
The thickness of water film was determined using an infrared moisture meter "IR-300" produced by Chino Corporation.
A calibration curve was determined by absorbing water present on a drum by a absorbing paper and plotting the weight of the absorbed water relative to the measure of the moisture meter.

(11) F-5 Value:
Using a tensile tester, a sample film with a width of 10 mm and a measuring length of 100 mm was stretched by a stretching speed of 200 m/min and the stress at the time of 5% elongation in the stress-strain curve was defined as the F-5 value. The determination was carried out under a condition of 25° C. and 65% RH.

(12) Draft Ratio R:
The draft ratio was represented as a ratio of a drawing speed Vc (m/min) of a thermoplastic resin film cooled and solidified by casting relative to a linear velocity Vd (m/min) of a molten thermoplastic resin flowing in a land of a die. Namely, R=Vc/Vd. In a case where it is difficult to determine the Vd, the value of "R" may be determined simply as R=(gap of a lip of the die (μm))/(thickness of obtained film (μm)).

(13) Apparatus and Measuring Conditions for Solid NMR:
As the apparatuses, (a) a spectrometer (produced by Jeol Ltd., JNM-GX270), (b) a solid amplifier and MAS controller (produced by Jeol Ltd., NM-GSH27MU) and (c) a probe (produced by Jeol Ltd., NM-GSH27T VT. W) were used.
The releasing time "T1 ρ" was determined from a releasing time in a rotary coordinate system of isotope $^{13}C$ cell nucleus of carborn C. The determination was carried out under a condition of a temperature of 25° C., a moisture of 50% RH and an intensity of static magnetic field of 6.3 tesla, and the resonance frequencies of $^1H$ and $^{13}C$ were 270.2 MHz and 67.9 MHz, respectively. Using MAS (magic angle rotation system) in order to remove the anisotropy of chemical shift, the rotational speed was set in a range of 3.5 to 3.7 kHz. In the conditions of the pulse system, initially 90° pulse was provided to $^1H$ for 4 μsec, the intensity of locking magnetic field was set to 62.5 kHz, the contact time of cross polarization (CP) for transferring the polarization of $^1H$ to $^{13}C$ was set to 1.5 msec, and using 0,001, 0.5, 0.7, 1, 3, 7, 10, 20, 30, 40 and 50 (msec) as the holding time "τ", the free induction decay (FID) of the magnetic vector of $^{13}C$ after the holding time "τ" was determined. As the repeating time of pulse, a range of 5 to 15 sec was employed.

The value of "T1 ρ" can be expressed by the following equation.

$$I(t) = \Sigma A_i \exp(-t/T1\rho i)$$

The value of "T1 ρ" can be determined by logarithmic plotting of peak intensities determined relative to the respective holding times and determination due to least square fitting method from the gradient of the plotting.

EXAMPLES AND COMPARATIVE EXAMPLES

Preferred examples will be hereinafter explained together with comparative examples. However, the present invention is not restricted by such examples.

Example 1.

Polyethylene terephthalate having an intrinsic viscosity of 0.85 and a melt specific resistance at 290° C. of $10^7$ Ω·cm was used as the thermoplastic resin. The thermal properties of the resin determined by DSC were Tg: 69° C., Tmb: 240° C., Tm: 255° C., Tme: 268° C., Tcb: 203° C., Tc: 188° C. and Tce: 174° C. The pellets of this polyethylene terephthalate were supplied to an extruder after being vacuum-dried at 180° C. for three hours, they were molten at 290° C. and supplied to a die. The die was a manifold die having a lip gap of 1.5 mm and a land length of 75 mm. A plurality of holes having a diameter of 7 mm and extending in the width direction of the die were defined in the walls forming the land of the die, and the land of the die was designed to be cooled by supplying air through these holes. The temperature of the die hopper was set at 290° C., and the air for cooling was supplied into the holes at a flow rate of 30,000 cm³/min to cool the land. The resin was molten in this state, and the film delivered out from the die was cooled and solidified on a casting drum controlled at a surface temperature of 25° C. while an electrostatic charge was applied to the film. The temperature of the resin at the entrance of the die was 290° C., the temperature of the resin at the entrance of the land was 286° C., and the temperature of the resin at the exit of the land was 247° C.

Successively, the film was supplied to a longitudinal stretching apparatus, and the film was heated by a plurality of heating rollers at a film temperature of 93° C. to pre-stretch the film at a draw ratio of 2.0 times. The birefringence of the film after the pre-stretching was 0,022. Thereafter, the film was heat treated by a plurality of heating rollers at a film temperature of 115° C. for 4 seconds, and the crystallinity of the film was controlled to 5.4%. The stretching strain and the stretching stress of the film had one-to-one correspondence. Then, the film temperature was controlled at 100° C., and a stretching was carried out at a draw ratio of 2.0 times. Successively, the film obtained was introduced into a tenter, and the film was preheated in an atmosphere of hot air at 95° C., stretched in the transverse direction at a draw ratio of 4.0 times in an atmosphere of hot air at 100° C., heat set for 5 seconds in an atmosphere of hot air at 220° C., sent out from the tenter while gradually cooled, and wound after trimming both edge portions of the film to prepare a biaxially oriented film having a thickness of 12 μm.

The conditions for forming the film in the respective processes are shown in Table 1, and the determined data of variation in thickness and ratio of sum of FFT spectral intensities and the estimation of suitability for processing are shown in Table 2. As shown these Tables, in this Example, a film having small variations in thickness in the respective wave number ranges, a high uniformity in thickness and causing no troubles such as snaking and wrinkles in a post processing was obtained.

Example 2

A biaxially stretched film Was prepared changing the flow rate of the cooling air in Example 1 to 52,000 cm³/min. The resin temperatures at the entrance of the die, the entrance of the land and the exit of the land were 290° C., 284° C. and 226° C., respectively.

The conditions for forming the film in the respective processes are shown in Table 1, and the determined data and estimated properties of the obtained film are shown in Table 2.

As shown these Tables, in this Example, a film having a smaller variation in thickness corresponding to the wave number range of 0.15 to 0.45 (1/m), a high uniformity in thickness and causing no troubles such as snaking and wrinkles in a post processing was obtained.

Example 3

A biaxially stretched film was prepared by heating the film at a film temperature of 90° C. by a plurality of heating rollers and stretching the film in the longitudinal direction at a draw ratio of 3.3 times and at a single stage in Example 1. Other conditions were the same as those in Example 1.

The conditions for forming the film in the respective processes are shown in Table 1, and the determined data and estimated properties of the obtained film are shown in Table 2.

As shown these Tables, in the film obtained in this Example, although the variation in thickness corresponding to the wave number range of 0.15 to 0.45 (1/m) was small, the variation in thickness corresponding to the wave number range of 1.00 to 2.00 (1/m) was slightly great but within the claimed range. Therefore, this film was within practical use, but in a post processing, wrinkles were generated slightly.

Comparative Example 1

The resin was extruded from the die changing the cooling air to water and setting the flow rate of the water to 18,000 cm³/min in Example 1. The resin temperatures at the entrance of the die, the entrance of the land and the exit of the land were 290° C., 282° C. and 195° C., respectively.

In this Comparative Example, the resin began to be solidified temporally, and as a result, a film could not be obtained.

Example 4

A biaxially stretched film was prepared changing the flow rate of the cooling air to a small value in Example 1 and other conditions were the same as those in Example 1. The resin temperatures at the entrance of the die, the entrance of the land and the exit of the land were 290° C., 288° C. and 267° C., respectively.

The conditions for forming the film in the respective processes are shown in Table 1, and the determined data and estimated properties of the obtained film are shown in Table 2.

As shown these Tables, in the film obtained in this Example, although the variation in thickness corresponding to the wave number range of 0.15 to 0.45 (1/m) was slightly great, it was within the range claimed. Further, although the variation in thickness was slightly great as the whole range and a slight snaking was observed in a post processing, because the variation in thickness corresponding to the wave number range of 1.00 to 2.00 (1/m) was small, it was sufficiently within practical use.

Example 5

The resin was extruded from the die changing the flow rate of the cooling air to a small value in Example 1, and the resin temperatures at the entrance of the die, the entrance of the land and the exit of the land were controlled to 290° C., 288° C. and 267° C., respectively. At that time, a casting drum having a water film with a thickness of 0.01 μm was used. The cast film was heated at a film temperature of 90° C. by a plurality of heating rollers, stretched in the longitudinal direction at a draw ratio of 2.2 times, and the birefringence was controlled to 0.032, and immediately after that, the film was heated at a film temperature of 105° C. to heat treat the film for 3 seconds and the crystallinity of the film was controlled to 8.3%. Thereafter, the film was cooled at 100° C., and stretched at a draw ratio of 1.7 times. A biaxially stretched film was prepared by setting other conditions to the same conditions as those in Example 1.

The conditions for forming the film in the respective processes are shown in Table 1, and the determined data and estimated properties of the obtained film are shown in Table 2.

As shown these Tables, in the film obtained in this Example, because a specified conditions for the longitudinal stretching were employed, the variation in thickness corresponding to the wave number range of 1.00 to 2.00 (1/m) became small, and as a result, the variation in thickness corresponding to the wave number range of 0.15 to 0.45 (1/m) became small affected with the former small variation in thickness, and a film causing no troubles such as snaking and wrinkles in a post processing could be obtained.

Comparative Example 2

A biaxially stretched film was prepared without supplying the cooling air into the land in Example 1. The resin temperatures at the entrance of the die, the entrance of the land and the exit of the land were 290° C., 288° C. and 278° C., respectively. Further, the film was heated at a film temperature of 95° C. by a plurality of heating rollers, stretched at a draw ratio of 2.0 times, and the birefringence of the film was controlled to 0.018, and immediately after that, the film was heated at a film temperature of 105° C. by a plurality of heating rollers and stretched at a draw ratio of 2.5 times. The crystallinity before the stretching was nearly 0%. Other conditions were the same as those in Example 1, and a biaxially stretched film was prepared.

The conditions for forming the film in the respective processes are shown in Table 1, and the determined data and estimated properties of the obtained film are shown in Table 2.

As shown these Tables, in the film obtained in this Comparative Example, because the resin temperature between the die and the casting drum was high, the variation in thickness corresponding to the wave number range of 0.15 to 0.45 (1/m) was great, and because the longitudinal stretching was carried out at a plurality of stages but there was no process for crystallization, the variation in thickness corresponding to the wave number range of 1.00 to 2.00 (1/m) was also great. As a result, the variation in thickness of the entire range was great, a snaking in a post processing was great and there observed wrinkles, and the film had a poor suitability for processing.

Comparative Example 3

A biaxially stretched film was prepared without supplying the cooling air into the land in Example 1. The resin temperatures at the entrance of the die, the entrance of the land and the exit of the land were 290° C., 288° C. and 278° C., respectively. Further, the film was heated at a film temperature of 90° C. by a plurality of heating rollers and stretched at a draw ratio of 3.3 times at a single stage.

The conditions for forming the film in the respective processes are shown in Table 1, and the determined data and estimated properties of the obtained film are shown in Table 2.

As shown these Tables, in the film obtained in this Comparative Example, because the resin temperature between the die and the casting drum was high, the variation in thickness corresponding to the wave number range of 0.15 to 0.45 (1/m) was great, and because the longitudinal stretching was carried out by a conventional single stage stretching, the variation in thickness corresponding to the wave number range of 1.00 to 2.00 (1/m) was also great. As a result, the variation in thickness of the entire range was great, there observed a great snaking and wrinkles in a post processing, and the film had a poor suitability for processing.

Examples 6 to 8

A biaxially stretched film having a thickness of 12 μm was prepared in a manner similar to that of Example 3 other than changing the draft ratio of 10 of Example 3 to draft ratios of 18 to 36 as shown in Table 3. Thus, by enlarging the draft ratio, the kinetic property of the molecule was restricted, and as a result, the value of "T1 ρ" became not less than 100, it is understood that a film having a high stiffness and a small variation in thickness, particularly, a small variation in thickness corresponding to the wave number range of 0.15 to 0.45 (1/m), could be obtained even if the film was a merely biaxially stretched film.

TABLE 1

| | Cooling air (water) Flow rate (cm³/min) | Temperature of resin (°C.) | | | Birefringence after entrusion (10⁻³) | Conditions of longitudinal stretching | | | Characteristics before main stretching | |
|---|---|---|---|---|---|---|---|---|---|---|
| | | Entrance of die | Entrance of land | Exit of land | | Pre-stretching | Heat treatment | Main stretching | Crystallinity (%) | Birefringence (10⁻³) |
| Example 1 | 30,000 | 290 | 286 | 247 | 0.3 | 93° C., 2.0 times | 115° C., 4 seconds | 100° C., 2.0 times | 5.4 | 25 |
| Example 2 | 52,000 | 290 | 284 | 226 | 0.7 | 93° C., 2.0 times | 115° C., 4 seconds | 100° C., 2.0 times | 6.1 | 27 |
| Example 3 | 30,000 | 290 | 286 | 247 | 0.3 | — | — | 90° C., 3.3 times | 0 | 0 |
| Comparative Example 1 | 18,000 | 290 | 282 | 195 | — | — | — | — | — | — |
| Example 4 | 3,000 | 290 | 288 | 267 | 0.2 | 93° C., 2.0 times | 115° C., 4 seconds | 100° C., 2.0 times | 3.8 | 23 |
| Example 5 | 3,000 | 290 | 288 | 267 | 0.2 | 90° C., 2.2 times | 105° C., 3 seconds | 100° C., 1.7 times | 8.3 | 32 |
| Comparative Example 2 | 0 | 290 | 288 | 278 | 0 | 95° C., 2.0 times | — | 105° C., 2.5 times | 0 | 18 |
| Comparative Example 3 | 0 | 290 | 288 | 278 | 0 | — | — | 90° C., 3.3 times | 0 | 0 |

TABLE 2

| | Variation in thickness | Ratio of sum of FFT spectral intensities | | Suitability for processing |
|---|---|---|---|---|
| | | 0.15–0.45 (1/m) Pw1/PwT | 1.00–2.00 (1/m) Pw2/PwT | |
| Example 1 | 2.8 | 0.14 | 0.10 | ○ |
| Example 2 | 1.7 | 0.09 | 0.08 | ○ |
| Example 3 | 4.2 | 0.12 | 0.15 | Δ |
| Example 4 | 3.8 | 0.20 | 0.13 | Δ |
| Example 5 | 2.9 | 0.19 | 0.09 | ○ |
| Comparative Example 2 | 6.8 | 0.32 | 0.26 | X |
| Comparative Example 3 | 7.5 | 0.30 | 0.22 | X |

TABLE 3

| | Draft ratio | T1ρ (msec) | Δn (10⁻³) | Variation in thickness (%) | Pw1/PwT | F-5 value (kg/mm²) |
|---|---|---|---|---|---|---|
| Example 3 | 10 | 100 | 0.3 | 4.2 | 0.12 | 14 |
| Example 6 | 18 | 118 | 0.4 | 2.9 | 0.12 | 20 |
| Example 7 | 25 | 125 | 2.5 | 2.1 | 0.09 | 25 |
| Example 8 | 36 | 138 | 6.2 | 2.8 | 0.07 | 28 |

Although preferred embodiments and examples of the present invention have been described herein in detail, it will be appreciated by those skilled in the art that various modifications and alterations can be made to these embodiments and examples without materially departing from the novel teachings and advantages of this invention. Accordingly, it is to be understood that all such modifications and alterations are included within the scope of the invention as defined by the following claims.

What is claimed is:

1. A thermoplastic polymeric resin film as extruded from a die having a land and an exit, said extruded film having substantially uniform thickness and having a thickness variation in the longitudinal direction of 5% or less, and
said film having a wave form as determined from spectral intensifies of wave-number components, wherein the ratio Pw1/PwT has a value of not more than 0.20,
wherein Pw1 is defined as the sum of spectral intensities of wave-number components present in the wave-number range of 0.15 to 0.45, and wherein PwT is defined as the sum of spectral intensities in the full wave-number range determined when a wave form of said variation in thickness is subjected to analysis by Fourier transformation.

2. A thermoplastic polymeric resin film as extruded from a die having a land and an exit, said extruded film having substantially uniform thickness and having a thickness variation in the longitudinal direction of not more than 5%;
wherein the ratio Pw2/PwT is not more than 0.15, as determined when a wave form of said variation in thickness is subjected to analysis by Fourier transformation,
wherein Pw2 designates the spectral intensity of wave-number components present in the wave-number range of 1.00 to 2.00,
and wherein PwT designates the sum of the spectral intensities of the full wave-number range.

3. A thermoplastic polymeric resin film as extruded from a die having a land and an exit, said extruded film having substantially uniform thickness and having a variation in thickness in the longitudinal direction of not more than 5%, said film having a ratio Pw1/PwT of not more than 0.20,
wherein Pw1 designates the sum of spectral intensities of wave-number components present in the wave-number range of 0.15 to 0.45,
and wherein PwT designates the sum of spectral intensities of the full wave-number range,
said spectral intensities being determined by subjecting a wave form of said thickness variation to analysis of Fourier transformation,
and wherein the ratio Pw2/PwT is not more than 0.15, and wherein the term Pw2 designates the sum of spectral intensities of wave-number components present in the wave-number range of 1.00 to 2.00, and wherein PwT is as previously defined.

4. A thermoplastic polymeric resin film as extruded from a die having a land and an exit, said extruded film having a thickness variation in the longitudinal direction of not more than 5%,
said film having a ratio Pw1/PwT determined when a wave form of said thickness variation is subjected to analysis of Fourier transformation, of not more than 0.20, wherein the term Pw1 designates the sum of spectral intensities of wave-number components present in the wave-number of 0.15 to 0.45, and wherein the term PwT designates the sum of spectral intensities of the full wave-number range, said film being made by supplying a thermoplastic resin to a die after heating and melting it at a temperature of not lower than the melting-finishing temperature of the polymer, spreading said resin across a manifold of said die in the width direction of said die, extruding said resin from said die after cooling said resin in a land of said die at a temperature lower than said melting-finishing temperature and equal to or above the cooling crystallization starting temperature of said polymer.

5. The fill defined in claim 4, further having a ratio Pw2/PwT of not more than 0.15 wherein the term Pw2 designates the sum of spectral intensities of wave-number components present in the wave-number range of 1 to 2, and wherein PwT designates the sum of the spectral intensities of the full wave-number range, all as determined when a wave form of said thickness variation is subjected to analysis of Fourier transformation.

6. The film defined in any of claims 1–5, said film further having an F-5 value equal to or greater than 20 kg/mm$^2$.

7. The fill defined in any of claims 1–5, wherein said polymeric resin is selected from the group consisting of a polyester, a blend of polyesters and a copolymer of polyesters.

8. The film defined in any of claims 1–5, said film being uniaxially or biaxially oriented.

* * * * *